United States Patent Office 3,345,422
Patented Oct. 3, 1967.

3,345,422
CONTROL OF OXYCHLORINATION REACTIONS
Loyd W. Piester and Raymond M. Vancamp, New Martinsville, W. Va., assignors to Pittsburgh Plate Glass Company, Pittsburgh, Pa., a corporation of Pennsylvania
No Drawing. Filed Aug. 25, 1964, Ser. No. 392,028
10 Claims. (Cl. 260—650)

The present invention relates to the oxychlorination of aliphatic hydrocarbons containing 1 to 2 carbon atoms, their incompletely chlorinated derivatives and benzene. More particularly, the present invention relates to a novel method for controlling oxychlorination reactions taking place in fluidized beds of catalyst particles to insure maximum productivity and adequate temperature control.

It is known in the art to prepare chlorinated hydrocarbons from saturated aliphatic hydrocarbons, their incompletely chlorinated derivatives and benzene by modified Deacon type chlorination procedures. Thus, an oxychlorination procedure of this type may conveniently involve the chlorination of the hydrocarbon and/or a chlorohydrocarbon with hydrogen chloride, an oxygen containing gas such as air, or elemental oxygen in the presence of a metal halide catalyst at elevated temperatures. In a process of this nature the hydrogen chloride is believed to be oxidized in the presence of the catalyst to chlorine and water, and the chlorine liberated in this manner from the hydrogen chloride reacts with hydrocarbon or chlorinated hydrocarbon present in the feed gas to the reaction zone to form further chlorinated hydrocarbons and HCl. HCl produced by the chlorination part of this procedure has been further utilized by addition of oxygen in the process.

In another modification of an oxychlorination process, elemental chlorine is used as the feed source. In this latter type operation, hydrogen chloride is generated by the chlorination of the hydrocarbon and/or hydrocarbon chloride fed with the elemental chlorine to the catalytic reaction zone. Thus, free chlorine, an oxygen containing gas, such as air, or oxygen itself, and a hydrocarbon and/or chlorohydrocarbon are passed in contact with a metal halide catalyst maintained at elevated temperatures. The chlorine presumably reacts with the hydrocarbon and/or chlorohydrocarbon to produce hydrogen chloride and a chlorinated derivative of the organic feed. The chlorine content of the hydrogen chloride produced in this manner is then utilized to achieve additional chlorinations by the standard Deacon type reaction in which the hydrogen chloride is oxidized to water and elemental chlorine.

The present invention is concerned with operations of the above character which take place in fluidized beds. In discussing fluidized beds in the specification and claims, it is to be understood that the term "fluidized bed" is employed in the broad sense. In conducting fluid bed processes, gaseous reactants of varying velocities are passed upwardly through a bed of finely divided, solid catalyst containing particles. When the gas is passed through a bed of solid particulate material several different conditions may be established depending upon the gas velocities employed, the size of the particles used, and other similar considerations. Thus, if the gas velocity is low, a bed of solids remains static. As the gas velocity is increased in the bed, however, some of the particles become dynamically suspended in the upwardly rising gas stream. As a result, the bed height expands and a bed which is termed "a dynamic bed" is established. If the gas velocity is still further increased, the particles all become suspended and the bed expands even further. Ultimately, the bed may assume a highly turbulent condition which in many ways resembles a boiling liquid. The present process may be applied to either dynamic beds or beds resembling the boiling liquid type and both beds are embraced by the term "fluidized bed" employed herein. The exact conditions requisite to establishing either of the bed conditions depends upon factors such as particle size, the bed components, gas velocities, density of the catalyst particles and other similar considerations. Wilhelm and Kwauk, Chemical Engineering Process, volume 44, page 201 (1948), equate the various factors necessary for fluidizing a bed and by following the principles therein discussed, the desired bed conditions may be provided for any given set of gases utilized or catalyst particles employed.

In conducting oxychlorination reactions of the above described type in fluidized bed catalytic reactors, considerable attention must be devoted to the control of reaction temperatures. Even though these reactions are taking place in fluidized bed reactors where heat transfer efficiencies are considerably improved over fixed bed reactors, the extreme exothermic nature of the reactions involved dictates that considerable attention must be given to properly controlling the temperature of the reactions to prevent serious side reactions from occurring. Thus, in many oxychlorination reactions it is undesirable that the temperatures exceed a given point due to the fact that deleterious results in terms of thermal cracking of desired products will occur. In addition, elevated temperatures considerably increase the loss of organic feed materials and the chlorinated organic products due to oxidation and/or hydrolysis. Still further, excessive temperatures occurring in fluidized bed reactors can cause sticking of bed particles with serious mechanical complications resulting therefrom.

In accordance with the present invention, many of the deleterious effects commonly encountered in the prior art are overcome. Thus, by virtue of the present invention a novel method of cooling fluidized beds of solid catalyst particles in which oxychlorination reactions are taking place is provided with a minimum amount of difficulty in controlling the temperatures and with a considerable improvement in the operation of the over-all oxychlorination process readily attained.

Thus, in accordance with this invention, organic product streams issuing from oxychlorination reactions are condensed, the hydrocarbon chloride products are liquefied during the condensation and returned to the reactor. The liquid organic materials returned to the reactor are introduced into the fluidized bed of reaction products at a point at or near the surfaces of the fluidized bed. The flow rate of liquid to the fluidized bed is correlated with the B.t.u.'s generated by the exothermic reactions occurring within the bed and the quantity of feed gases employed, so that a sufficient quantity of chlorinated organics are introduced into the bed to provide the necessary quantity of liquid for the successful removal of the heat generated during reaction.

Prior to the introduction of these materials into the fluidized beds, the water and HCl contained in the organic streams, which are condensed to provide the cooling fluid, are removed so that an essentially organic liquid body is introduced into the fluidized bed to control the temperature of the reaction. The material fed to the reaction zone must be fed at a point above the fluidized bed and at a rate into the space above the fluidized bed such that the organic material actually contacts the contents of the fluidized bed. Thus, one important consideration of the invention is that the organic cooling fluid employed physically contacts the catalyst particles contained in the fluidized bed in which the organic fluid is introduced. Should the organic solution be placed in the vapor space above the fluidized bed in quantities at a rate and at a distance such that it is vaporized prior to touching the catalyst particles of the bed, the results will not be satisfactory and the catalyst particles will not be cooled sufficiently to enable adequate temperature control of the reaction zone to occur.

In conducting oxychlorination reactions in accordance with this invention, recourse to standard fluidized techniques is had and conventional oxychlorination catalysts may be employed. Catalysts generally employed in the oxychlorination of aliphatic hydrocarbons and their incompletely chlorinated derivatives are copper chloride containing catalysts impregnated on carriers which have physical properties sufficient to enable them to physically withstand the conditions of fluidization. Generally speaking, the active components of the catalysts are multivalent halides such as copper, iron, chromium and the like. Generally, copper forms the preferred multivalent metal employed and it is typically employed as a chloride. In addition to the utilization of multivalent metal halides associated metals may also be employed. Thus, as is commonly practiced in the art, copper chloride is often associated with an alkali metal halide such as potassium chloride or an alkaline earth metal halide. In the preferred embodiment of the instant invention, a copper chloride-potassium chloride catalyst is employed and is impregnated on a porous carrier.

The selection of the particular carrier which will be employed will depend in part upon the reaction conditions which are encountered, the extent of fluidization and other similar considerations. Generally speaking, a material such as a calcined fuller's earth, diatomaceous earth, and other like materials may be employed. A particularly effective carrier for use in the reactions herein contemplated has been found in Florex (a calcined fuller's earth manufactured by the Floridian Corporation). Florex impregnated with equimolar proportions of copper chloride and potassium chloride forms the preferred catalyst material for utilization in the fluidized bed operations herein contemplated.

Many methods may be employed to place the catalyst material upon the carrier. Thus, recourse to immersion of the carrier particles in solutions containing the metal halide components of the catalyst may be had if desired or the metal halide containing solution may be sprayed or dropped on catalyst particles, rotated in drying devices such as roto-tumblers and other similar liquid-solid contact equipment. In addition, if desired, the metal halides may be deposited on the carriers by causing a solution of metal halide to be added to a fluidized bed of carrier particles in dropwise fashion.

The temperatures employed in the oxychlorination reactions contemplated by this invention will vary considerably depending upon the particular oxychlorination reaction which it is desired to conduct in the fluidized bed of catalyst particles. Temperatures ranging broadly between 500° F. and 1100° F. may be employed. Typically most oxychlorination reactions take place in the temperature range of between 550° F. and 900° F. However, certain oxychlorination reactions such as the oxychlorination of ethane to vinyl chloride requires excessively high temperatures on the order of 1000° F. to 1100° F. Similarly, with materials such as ethylene, oxychlorination reactions may be conducted at temperatures of 550° F. or below. Thus, the precise temperature conditions selected will be determined in part by the particular product desired and the feed materials employed.

The fluidized bed reactors employed in accordance with this invention are operated typically at or slightly above atmospheric conditions of pressure. The pressures employed typically range between 5 to 45 p.s.i.g. If desired, it is of course permissible to operate the fluidized bed reactors under conditions of substantial pressure and the instant invention contemplates the utilization of either atmospheric conditions of pressure or superatmospheric conditions of pressure. It will be readily understood by the skilled in the art that operation at conditions of pressures substantially in excess of atmospheric pressure gives rise to a higher yield of product per unit volume of reactor employed, and so long as the quantity of heat generated in the reaction zone can be removed by liquid fed to the reaction zone as an organic solution, no particular problem is involved in operating at superatmospheric pressures.

The particular manner in which reaction gases issuing from the reaction zone are recovered is of no consequence so far as the instant invention is concerned so long as the gases are condensed and liquefied so that at least a portion of the gaseous effluent in the reaction zone may be returned to the reactor in the liquid state and in the absence of any appreciable quantities of water and HCl. Generally, reactant gases issuing from the reaction zones, in which oxychlorination reactions have been conducted, are contacted with water and caustic soda to remove the HCl content contained therein. Once the HCl has been removed, condensation of the remaining gases is readily accomplished to provide a liquid body of mixed chlorinated organics. This chlorinated organics solution in accordance with the teachings of the instant invention is divided into a product recovery stream and a cooling stream, the latter being fed to the reaction zone to provide the necessary cooling. The cooling fluid returned to the reaction zone may be returned as collected in a liquid stream or may be cooled on its return to the reactor.

In conducting the fluidized bed reactions in accordance with the teachings of this invention, normally metal reactors are employed which are corrosion resistant to the reactions occurring at the temperatures and under the conditions of operation contemplated. Thus, corrosion resistant equipment such as nickel or Inconel is generally employed to provide maximum protection during fluidization. In addition ceramic lined reactors may also be employed or any other corrosion resistant equipment may be utilized for the reaction vessels themselves.

As previously stated, the exact temperature conditions which are employed in the fluidized reactors themselves will vary depending upon the particular chlorinated hydrocarbon which is desired in the final product. Thus, where perchloroethylene and trichloroethylene are the desired products, and ethylene dichloride is the initial feed material, temperatures may range broadly between 650° F. and 900° F. Where vinyl chloride is the desired product and ethane is the feed material, temperatures on the order of 842° F. to 1112° F. may be employed. In oxychlorinating methane, temperatures in the neighborhood of 752° F. to 914° F. may be employed. Whatever the precise temperature condition desired, the efficacy of the instant process is not in any way impaired since sufficient organic pourback can be obtained to provide the requisite temperature condition for the desired product based on the feed material utilized.

The exact manner in which organic products are recovered from oxychlorinations in accordance with this invention is of no particular consequence and recourse to organic absorbents may be had or simple mechanical condensation and phase separation of the organic and inorganic liquids contained in the reactor gases may be used. A particularly effective method of separating the organic-inorganic layers has been found in water scrubbing the off gases to remove HCl. This scrubbing step is followed by a condensation of the gas stream in a liquid cooled condenser. The condensed liquid is then passed to a phase separator where it is permitted to physically separate into an organic and an aqueous layer. The ultimate recovery of the products may be accomplished by recourse to ordinary distillation techniques.

For a more complete understanding of the present invention, reference is made to the following examples which illustrate certain modes of operation in conducting the reaction in accordance with the instant invention.

EXAMPLE I

A nickel reactor 13 feet in height and 15 inches in diameter was employed as a fluidized bed reactor. The reactor was enclosed in a 20 inch diameter steel jacket forming an annular heat exchange system with Dowtherm$^R$ A (a diphenyl-diphenyl oxide eutectic) circulating in the steel jacket to heat and/or cool the fluid bed. An 8 inch nickel internal cyclone was located at the top of the reactor and a 20 inch diameter by 18 inch high expanded section was provided at this point. Located in the bottom of the reactor was a nickel distributor plate having a plurality of drilled holes therein. Below the distributor plate was a chamber or wind box closed at the bottom and sides and serving as an introduction chamber for the reactant feed gases. Also located in the bottom of the reactor 14 inches above the distributor plate was a nickel ring utilized to feed oxygen to the reactant zone. The reactor was filled to a depth of 8 feet with a catalyst material comprising copper chloride-potassium chloride impregnated on Florex (calcined fuller's earth manufactured by the Floridin Corporation).

The catalyst was prepared by dissolving 29 pounds of copper chloride ($CuCl_2 \cdot 2H_2O$) and 15.2 pounds of potassium chloride (KCl) in 5.3 gallons of distilled water. This catalyst solution was then placed on 30 to 60 mesh (U.S. Sieve Series) Florex particles by dropwise addition to the particles being fluidized in a 10 inch diameter reactor having warm air blown up through it at a superficial linear velocity of 0.5 foot per second. The temperature of the bed during the dropwise addition of the entire 5.3 gallons of solution was maintained at 220° F. Based on the total weight of the particles, the finished catalyst contained 7 percent by weight copper on an anhydrous basis.

The reactor was then filled to a depth of 8 feet with catalyst particles prepared as described above. Three gas feed lines were provided for the introduction of oxygen, hydrocarbon chlorides and/or hydrocarbons and a chlorinating agent. Two of the feed lines terminated in the reactor wind box. The third feed line was connected to the ring located up in the bed. Utilizing this apparatus, ethylene dichloride and elemental chlorine were fed to the wind box of the reactor and oxygen to the ring in a molar feed ratio of ethylene dichloride to chlorine to oxygen of 1.0 to 0.54 to 1.02. Connected to the vent of the reactor was a condensing system comprising two tubular condensers. The first condenser was operated and cooled with water at 45° F. and had an effective cooling area of 85.2 square feet. The reactor effluent was passed into the primary condenser and condensed therein and the liquid organic removed at 170° F. The secondary condenser was refrigerated at 6° F. and liquid organic recovered from this condenser attained a temperature of 32° F. The liquid organic from the first condenser, that is, at 170° F. was passed into a recycle line which connected with an inlet pipe located in the top of the reactor and passing down through the vapor space to a point 36 inches from the top of the fluidized bed when in an expanded condition.

Utilizing this equipment and bed temperature of 766° F. to 819° F. the superficial linear gas velocity was regulated at 0.53 to 0.58 foot per second. A per-tri ratio of 0.98 was desired. Utilizing this equipment and the organic pourback at a rate such that 580 pounds per hour of organic liquid was fed to the reactor during the reaction, a per-tri composition was obtained from ethylene dichloride. The results are set forth below in Table I.

Pourback.—15" I.D.—Fluid bed reactor results with liquid organic pourback cooling

TABLE I

| | |
|---|---|
| Duration of balance, hours | 43 |
| Halogen | $Cl_2$ |
| Expanded catalyst bed height, feet | 8 |
| Bed temperature (a) 10" from bottom, ° F. | 819 |
| Bed temperature (a) 7' from bottom, ° F. | 766 |
| Molar feed ratio, $EDC:Cl:O_2$ | 1.0:0.54:1.02 |
| Superficial feed velocity, ft./sec. | 0.58 |
| Per/tri weight ratio | 0.98 |

| Mole percent EDC converted to: | |
|---|---|
| Perchlor+trichlor | 69.0 |
| $C_2H_2Cl_2$'s | 10.4 |
| $C_2H_2Cl_4+C_2HCl_5$ | 4.4 |
| Miscellaneous $C_2$'s | 1.7 |
| Total $C_2$ chlorinated organics | 85.5 |
| Total chloride utilization | 91.5 |

| Chlorinated organic composition: | Weight percent |
|---|---|
| Perchlor+trichlor | 82.3 |
| $C_2H_2Cl_2$'s | 8.2 |
| $C_2H_2Cl_4+C_2HCl_5$ | 6.4 |
| Miscellaneous $C_2$'s | 1.5 |
| $C_1$'s | 1.6 |

| Pourback composition: | Weight percent |
|---|---|
| Perchlor+trichlor | 82.3 |
| $C_2H_2Cl_2$'s | 8.2 |
| $C_2H_2Cl_4+C_2HCl_5$ | 6.4 |
| Miscellaneous $C_2$'s | 1.5 |
| $C_1$'s | 1.6 |

EXAMPLE II

Utilizing the same equipment, catalyst, and procedures of operation as in Example I a run was made by feeding ethylene dichloride, HCl and oxygen to the reactor of Example I. The molar ratio of ethylene dichloride to HCl to oxygen was 1 to 1.07 to 1.29 and the gases were fed at a superficial linear velocity of 0.53 foot per second. The bed temperatures ranged between 781° F. and 819° F. In this run a chlorinated organic liquid stream was fed to the reactor in at the top at a rate of 570 pounds per hour. The results of the run are set forth in Table II.

Pourback.—15" I.D.—Fluid bed reactor results with liquid organic pourback cooling

TABLE II

| | |
|---|---|
| Duration of balance, hours | 38 |
| Halogen | HCl |
| Expanded catalyst bed height, feet | 8 |
| Bed temperature (a) 10" from bottom, ° F. | 819 |
| Bed temperature (a) 7' from bottom, ° F. | 781 |
| Molar feed ratio, $EDC:HCl:O_2$ | 1.0:1.07:1.29 |
| Superficial feed velocity, ft./sec. | 0.53 |
| Per/tri weight ratio | 0.99 |

| Mole percent EDC converted to: | |
|---|---|
| Perchlor+trichlor | 65.9 |
| $C_2H_2Cl_2$'s | 7.9 |
| $C_2H_2Cl_4+C_2HCl_5$ | 7.0 |
| Miscellaneous $C_2$'s | 4.1 |
| Total $C_2$ chlorinated organics | 84.7 |
| Total chloride utilization | 91.4 |

| Chlorinated organic composition: | Weight percent |
|---|---|
| Perchlor+trichlor | 78.9 |
| $C_2H_2Cl_2$'s | 6.1 |
| $C_2H_2Cl_4+C_2HCl_5$ | 10.0 |
| Miscellaneous $C_2$'s | 3.9 |
| $C_1$'s | 1.1 |

| Pourback composition: | Weight percent |
|---|---|
| Perchlor+trichlor | 78.9 |
| $C_2H_2Cl_2$'s | 6.1 |
| $C_2H_2Cl_4+C_2HCl_5$ | 10.0 |
| Miscellaneous $C_2$'s | 3.9 |
| $C_1$'s | 1.1 |

EXAMPLE III

Utilizing the equipment and catalyst of Example I a similar run is made in which ethylene, oxygen and HCl are fed in a mole ratio of ethylene to HCl to oxygen of 1 to 2 to 0.5 to a fluidized bed of catalyst particles maintained at a temperature of 550° F. Gases are fed at a superficial linear velocity of 0.5 foot per second. Utilizing this equipment and recycling organic product collected from the reaction zone to the reaction zone to maintain the temperature, good utilization of ethylene and HCl is obtained with a high recovery of ethylene dichloride realized.

EXAMPLE IV

Utilizing the equipment and catalyst of Example I and feeding methane and air and HCl in a molar ratio of methane to air to HCl of 1 to 5.5 to 2.15 to a fluidized bed of catalyst particles maintained at a temperature of 896° F. and at a superficial linear velocity of 0.5 foot per second, a chlorinated methane product stream is obtained. The chlorinated methanes in the exit gases are condensed and utilized in part as recycle to the reaction zone to control reactor temperature conditions. Utilizing this equipment satisfactory yields of chlorinated methanes are obtained with high utilization of both the chlorinating agent and organic feed.

EXAMPLE V

Utilizing the equipment and catalyst of Example I and feeding benzene, HCl and air in a mole ratio of HCl to oxygen (as air) to benzene of .5 to .375 to 1 to the fluidized bed of catalyst particles maintained at a temperature of 600° F. and utilizing a contact time of 5.7 seconds a chlorinated benzene product stream is contained. The product stream obtained is 49.8 percent benzene. 42.2 percent monochlorobenzene, 5.5 percent paradichlorobenzene and 2.5 percent orthodichlorobenzene, all percent being by weight of product stream. HCl utilizations of 92.2 percent are obtained.

As can be readily seen from the above examples, utilization of the organic pourback cooling system provides certain advantages in conducting oxychlorination reactions. Thus, in addition to providing adequate temperature control of oxychlorination reactions being conducted in fluidized beds, the organic pourback gives rise to high utilization of the chlorinating agents employed.

While the invention has been described with reference to cetrain specific examples, it is of course to be understood that the invention is not to be limited thereby, except insofar as appears in the accompanying claims.

We claim:

1. In a method of chlorinating a member of the group consisting of aliphatic hydrocarbons having 1 to 2 carbon atoms, their incompletely chlorinated derivatives and benzene by passing a member of the group to be chlorinated, oxygen and a chlorinating agent selected from the group consisting of chlorine, HCl and mixtures of chlorine and HCl in the vapor phase through a fluidized bed of metal halide catalyst particles the improvement comprising condensing the product stream from said bed to recover the chlorinated organic content thereof as liquid, separating HCl and water from said liquid chlorinated organics, feeding a portion of said liquid chlorinated organics to the top of said fluidized bed to at least wet some catalyst particles and regulating the quantity and rate of feed of the portion so fed to maintain the temperature of the bed at a predetermined value.

2. The method of claim 1 wherein the member of said group is ethylene dichloride and the temperature of the bed is maintained between 650° F. to 900° F.

3. The method of claim 1 wherein the member of said group is benzene and the temperature of the bed is maintained between 500° F. and 700° F.

4. The method of claim 1 wherein the member of said group is ethylene and the temperature of the bed is maintained between 500° F. and 650° F.

5. In a method of chlorinating a member of the group consisting of aliphatic hydrocarbons having 1 to 2 carbon atoms, their incompletely chlorinated derivatives, and benzene by reacting a member of the group to be chlorinated, oxygen and a chlorinating agent selected from the group consisting of chlorine, HCl and mixtures of chlorine and HCl in the vapor phase in a fluidized bed of metal halide catalyst particles the improvement comprising recovering the product stream resulting from the reaction, condensing the organic contents of said stream, removing water and HCl from the condensed organic contents, returning a portion of said condensed organic contents as liquid to the top of said fluidized bed to at least wet some catalyst particles, regulating the rate of feed and quantity of said portion of condensed organic liquid to maintain the temperature of said fluidized bed within a predetermined range of values and recovering chlorinated hydrocarbon product from a second portion of said condensed organic liquid contents.

6. In a method of producing chlorohydrocarbons by chlorinating a member of the group consisting of aliphatic hydrocarbons having 1 to 2 carbon atoms, their incompletely chlorinated derivative and benzene involving reacting a member of the group to be chlorinated, oxygen and a chlorinating agent selected from the group consisting of chlorine, HCl and mixtures of chlorine and HCl in the vapor phase in a fluidized bed of catalyst particles the improvement comprising recovering the chlorohydrocarbons so produced from the product of said fluidized bed, condensing said product stream to liquefy the chlorohydrocarbons, water and HCl present therein, removing water and HCl from said liquefied product stream, feeding a portion of said condensed chlorohydrocarbons as liquids to the top of said fluidized bed to at least wet some catalyst particles while regulating the rate of feed and quantity of the portion so fed to maintain the temperature of the bed at a predetermined range of values.

7. In a method of producing hydrocarbon chlorides by chlorinating a member of the group consisting of aliphatic hydrocarbons having 1 to 2 carbon atoms, their incompletely chlorinated derivatives and benzene involving reacting a member of the group to be chlorinated, oxygen and a chlorinating agent selected from the group consisting of chlorine, HCl and mixtures of chlorine and HCl in the vapor phase in a fluidized bed of catalyst particles the improvement comprising removing the product gases from said fluidized bed, scrubbing said gases with water and aqueous alkaline solution to thereby remove any HCl present, condensing the scrubbed gases to liquefy the hydrocarbon chloride content of said scrubbed gases, phase separating said hydrocarbon chloride liquid from water present in the liquefied condensate, feeding a portion of the separated hydrocarbon chloride liquid to a still system for recovery of product, feeding a second portion of said separated hydrocarbon chloride liquid to the top of said fluidized bed at a point near the surface of said bed to thereby at least wet some of the catalyst particles therein, and regulating the quantity and rate of feed of said second portion to provide sufficient liquid hydrocarbon chloride in said second portion to maintain the fluidized bed temperature between 500° F. and 1100° F.

8. The method of claim 7 wherein the member of said group is ethylene dichloride and the temperature of the bed is maintained between 650° F. and 900° F.

9. The method of claim 7 wherein the member of said group is ethylene and the temperature of the bed is maintained between 500° F. and 650° F.

10. The method of claim 7 wherein the member of said group is benzene and the temperature of the bed is maintained between 500° F. and 700° F.

References Cited

UNITED STATES PATENTS

| | | | |
|---|---|---|---|
| 2,746,844 | 5/1956 | Johnson et al. | 260—659 X |
| 2,783,286 | 2/1957 | Reynolds | 260—659 |
| 3,210,431 | 10/1965 | Engel | 260—650 |

FOREIGN PATENTS 1,312,859  11/1962  France.

LEON ZITVER, *Primary Examiner.*

N. J. KING, H. MARS, *Assistant Examiners.*